Oct. 9, 1956
S. KRILANOVICH
2,766,007
CAMERA HOIST
Filed Aug. 14, 1951
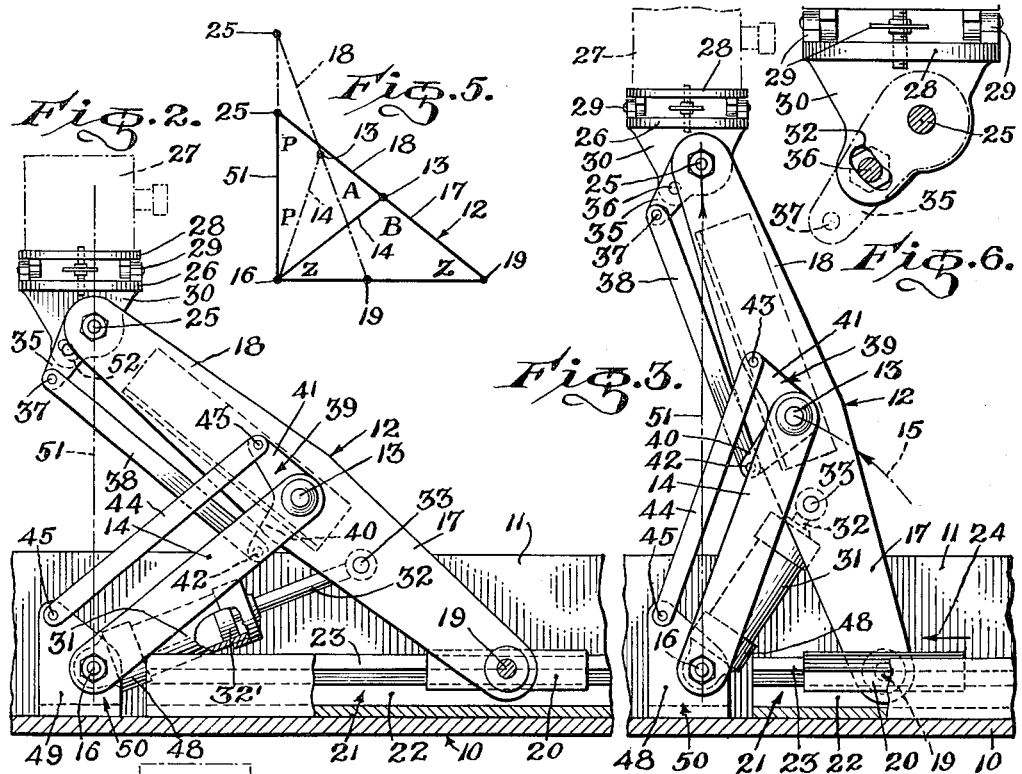
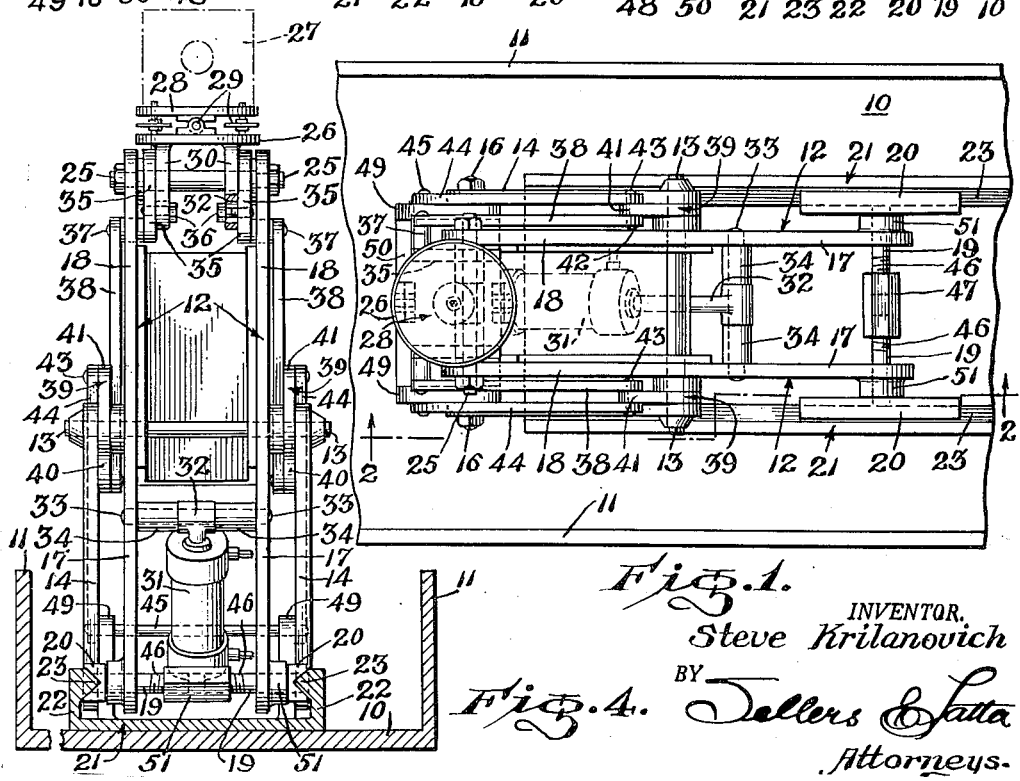
INVENTOR.
Steve Krilanovich
BY
Sellers & Latta
Attorneys.

United States Patent Office 2,766,007
Patented Oct. 9, 1956

2,766,007

CAMERA HOIST

Steve Krilanovich, North Hollywood, Calif.

Application August 14, 1951, Serial No. 241,769

6 Claims. (Cl. 254—124)

This invention relates to a camera hoist and has as its general object to provide a mechanism for supporting a moving picture camera for elevation changing movement in a strictly vertical path, while maintaining the camera in a level position.

The invention attains particular usefulness when embodied in a mobile camera truck such as is commonly employed in moving picture studios in taking pictures at various locations on a movie lot, although it is to be understood that the invention need not necessarily be incorporated in a mobile unit. At any particular location of the camera, it often becomes desirable to move the camera vertically without changing its horizontal distance from the subject being photographed. With a conventional camera hoist, embodying a boom swinging about a pivot which is fixed against horizontal movement, the arcuate path of swinging movement of the outer end of the camera carrying boom, will include components of both vertical and horizontal movements. In order to bring the camera to a position at the same horizontal distance from the subject as a previous position from which it has been shifted vertically, it is necessary in the conventional hoisting equipment or camera boom, to make an adjustment in the length of the boom or in the position of the boom support (as by shifting the boom supporting truck) to compensate for the horizontal shift of the outer end of the boom as it is swung arcuately about its supporting pivot. Such adjustments either require the taking of measurements between the camera and the subject in the various positions of vertical adjustment, or the operator must rely upon guesswork in estimating such distance.

The invention is particularly useful in the filming of scenes against a vertical back-drop (e. g. a panoramic view of scenery painted upon a vertical screen) in which, at certain stages, it may be desirable to scan the backdrop vertically while continuing to film the picture. Under such conditions it is extremely difficult for an operator to effect the continuous adjustment of the camera boom or truck that would be necessary in order to maintain the constant horizontal distance of the camera from the back drop, while effecting the vertical movement of the camera. The present invention obviates all difficulty in this respect.

It will now be apparent that, in any situation where a vertical adjustment of the camera without changing its horizontal spacing from the subject is called for, there is a distinct need for a hoisting mechanism capable of automatically maintaining the camera at a fixed horizontal distance from the subject while shifting the camera vertically. Also, there is a need for such mechanism which can simultaneously maintain the camera in a level position (avoiding any tilting of the optical axis of the camera from a horizontal position or any position approaching the horizontal, to which it has been initially set). The present invention proposes to automatically provide both of these functions in connection with the vertical shifting of the camera.

A further object is to provide such a hoist, having power energized means for actuating the hoist mechanism in attaining the combination of strictly vertical shift and constant levelling, above referred to.

A further object of the invention is to provide a camera hoist having the above indicated improvement over conventional hoists, and yet avoiding any added complexity or cost in construction while being just as sturdy and durable as any conventional camera hoist mechanism.

Other objects will become apparent in the ensuing specifications and appended drawings in which:

Fig. 1 is a plan view of a portion of the bed of a sound truck with the mechanism of my invention installed therein;

Fig. 2 is a vertical sectional view of the same taken on the line 2—2 of Fig. 1, the mechanism being shown in a lowered position;

Fig. 3 is a similar view with the exception that the mechanism is shown in an elevated position;

Fig. 4 is an end view of the mechanism with the hoist bed shown in transverse section;

Fig. 5 is a geometrical diagram illustrating the principle upon which the vertical path of movement is based; and Fig. 6 is a detail of the camera mounting.

As an example of one form in which the invention may be embodied, I have shown in the drawing a camera hoist mechanism mounted upon a supporting base 10. The base 10 may be the bed of a sound truck or it may be simply a pedestal fixed to or resting upon any supporting surface. In the usual embodiment of the invention in which the hoist is mounted upon a sound truck, base 10 will be supported by conventional supporting wheels or casters which are not shown herein, and the members indicated at 11 would constitute the sides of the truck.

My improved hoist mechanism comprises generally a boom 12 which is centrally pivoted, at 13, to an arm or arms 14 which guide the pivot 13 in an arcuate path (indicated by broken line 15) of swinging movement about a fixed pivot 16 adjacent the base 10. In the embodiment shown, boom 12 comprises a pair of spaced parallel bars, and there are a pair of the arms 14 embracing the boom.

Boom 12 may be considered as embodying, on the respective sides of its central pivot 13, a lower arm 17 and an upper arm 18. Lower arm 17 is connected, by a pivot 19, to a carriage which may comprise a pair of slides 20, slidable horizontally in a track 21 secured to base 10. Track 21, as shown, is in the form of a web or plate secured to the base 10 and having at its respective sides thereof, upwardly extending flanges 22 formed integrally with triangular section rails 23 bearing in correspondingly angular ways in slides 20. Movement of the lower end of arm 17, as pivot 13 swings upwardly along the path 15, is indicated by arrow 24 in Fig. 3.

To the upper end of arm 18 is attached, by means of a pivot 25, a camera base 26 which functions to support the camera, indicated in broken lines 27. The camera base 26 may carry a conventional platform 28, to which the camera 27 is directly secured. A tilting connection 29 joins platform 28 to base 26 on an axis parallel to boom 12. Base 26 also embodies a pair of ears 30 projecting downwardly therefrom and providing a pivotal connection with pivot 25 (which may consist in a bolt or shaft extending through the respective bars of boom 12 and through the respective ears 30 and secured by nuts threaded into its outer ends).

Attached to ears 30 are a pair of arms 35 which project laterally from pivot 25 with reference to the longitudinal axis of boom 12. Arms 35 are confined between arms 18 and ears 30, have their upper ends mounted upon pivot shaft 25, and have their intermediate portions adjustably secured to ears 30 by means of bolts 36 extending through arcuate slots 52 in ears 30 and fixed in levers 35. Slots 52 are concentric with pivot shaft 25. The connection provides for tilting adjustment of base 26 about shaft 25. This adjustment cooperates with the tiltable mounting 29 for providing universally tiltable adjustment for levelling purposes.

A servomotor for power actuation of the hoist is provided in the form of a hydraulic motor embodying a cylinder 31 and a piston 32' secured to a piston rod 32. The lower end of cylinder 31 is pivotally attached to base 10. For simplicity, the pivot 16 is utilized for such pivotal attachment, although it is not essential that the axis of attachment of cylinder 31 to base 10 coincide with that of arms 14. The upper end of piston rod 32 is attached to lower arm 17 of boom 12, by means of pivot 33 which, in the form shown, consists in a shaft extending through the upper end of rod 32, having its ends fixed in arms 17, and carrying spacer sleeves 34 for maintaining a centered position of rod 32 between arms 17. Suitable connections (not shown) for injecting a hydraulic fluid under pressure between the upper end of cylinder 31 and piston 32', are provided. Pivot 33 is disposed between pivots 13 and 19. Accordingly, the action of the hydraulic fluid between the upper end of cylinder 31 and the piston will be effective to draw arm 17 toward arms 14 (as indicated by arrow 24 in Fig. 3), causing arm 14 and boom 12 to tilt upwardly (e. g. from the lower position shown in Fig. 2 to the elevated position shown in Fig. 3).

Attached to the outer ends of arms 35, by means of pivots 37, are links 38 which are parallel to the longitudinal axis of boom 12. Bell crank levers 39 are pivotally mounted upon pivot 13. Each of the levers 39 includes an arm 40 extending laterally, generally parallel to arms 35 and in the same direction and same distance from the axis of boom 12, and an arm 41 extending upwardly and laterally from a corresponding arm 14. The lower ends of links 38 are attached by pivots 42 to the outer ends of arms 40, and the upper ends of arms 41 are attached by pivots 43 to the upper ends of a pair of links 44 paralleling arms 14. The lower ends of links 44 are attached to pivots 45 which are fixedly mounted with respect to base 10, at positions having a lateral spacing from pivot 16 corresponding both in distance and direction to that of pivots 43 from pivot 13.

It will now be apparent that the linkage just described provides two sets of parallelogram structure, one connecting the pivots 13 and 43 in constantly parallel relation to pivots 16 and 45, respectively, and the other connecting pivots 13 and 42 in constantly parallel relation to pivots 25 and 37, respectively. Since the angular relation between the arms 40 and 41, which form a common connection between these two parallelogram linkages, remains fixed by virtue of the fact that these two arms are integral parts of bell crank 39, the angular relation between pivots 45 and 16 and pivots 37 and 25 will correspondingly remain fixed. Since the angular relationship between pivots 45 and 16 is fixed with reference to base 10, the angular relationship of camera base 26 to truck bed 10 will likewise remain fixed (i. e. parallel).

Pivot 19, in the construction shown, is constituted by a pair of studs integrally united at their outer ends to the respective slides 20 and having threaded inner ends 46 which are joined by a turn buckle sleeve 47. The purpose of sleeve 47 is to adjust the spacing between slides 20 to provide clearance between the slide surfaces which is at a minimum consistent with free sliding operation. Studs 19 extend through and are journalled in bearing bosses 51 on the lower ends of the respective arms 17, whereby the arms 17 may pivot upon studs 19.

Pivot 16 may comprise a shaft having a central portion extending through the lower head 48 of cylinder 31, having end portions extending through upstanding ears 49 at the respective ends of a bracket 50 secured to base 10, having threaded ends and secured by nuts threaded thereon.

*Operation*

Considering the operation of the apparatus beginning with the lowered position of Fig. 2 and proceeding toward the raised position of Fig. 3, it will be apparent that the introduction of hydraulic fluid under pressure into the upper end of cylinder 31 will cause piston rod 32 to be drawn into the cylinder, pulling arm 17 toward arm 14 as indicated by arrow 24 and causing pivot 13 to swing arcuately upwardly as indicated by the arrowhead in path 15. The movement of pivot 25 will be a strictly vertical movement along the path indicated by broken line 51, and in an upward direction as indicated by the arrowhead in line 51.

The truly vertical movement of pivot 25 arises from the proportioning of arms 14, 17 and 18 so that the effective length of all three arms (as defined between the pairs of pivots 16—13, 13—19, and 13—25 respectively) is the same.

In using the term "strictly vertical movement," what is actually meant is that the path of movement 51 of pivot 25 is at right angles to the common plane of pivots 16 and 19. Pivots 16 and 19 are accordingly, in preferential practice, located in a common plane parallel to base 10 which in turn is so supported upon its supporting means (e. g. truck wheels) as to be parallel to any horizontal supporting surface on which the truck rests. It is to be understood therefore that if the truck is resting upon an inclined surface, the path 51 of elevation of the camera base will be correspondingly inclined from the truly vertical.

From the foregoing, it can be shown that, if the plane of pivots 16 and 19 be considered as the base of a triangle having the longitudinal axis of boom 12 as its hypothenuse, the vertical arm of such triangle, represented by the path 51 of elevation of pivot 25, must remain at all times at right angles to said base. That this will actually be true can be demonstrated mathematically by reference to Fig. 5, in which the line 16—19 represents the base of the large triangle shown therein, the line 12 (boom) represents the hypothenuse thereof, and the line 51 represents the vertical side thereof. This large triangle is divided into two smaller triangles by the line 14 (corresponding to arms 14 of the mechanism). The respective corners of the two small triangles are defined by the pivots 13, 16, 19, on the one hand and the pivots 13, 16, 25, on the other hand. The angles defined at the respective corners of the lower triangle are designated B, Z, and Z respectively, and the angles at the respective corners of the upper triangle are designated A, P and P respectively. Since the sides 14 and 17 of the lower triangle are equal and correspondingly the sides 14 and 18 of the upper triangle are equal, it will be apparent that both of the smaller triangles are isosceles triangles, the first having as its base the line 16—19, and the second having as its base the line 51. Accordingly, the same character Z is employed to indicate both of the base angles of the lower triangle and correspondingly the same character P is used to indicate both of the base angles of the upper triangle.

Since the sides 17, 18 together constitute a straight line (axis of boom 12) it will be readily apparent that the two apex angles A and B will add up to 180°, i. e., (1) $\qquad A+B=180°$ Since the sum of the three included angles of any triangle is also equal to 180°, it will be equally apparent that (2) $\qquad B+2Z=180°$ and (3) $\qquad A+2P=180°$ From the three above equations, the following can be readily derived:

(4) $\qquad A+B=B+2Z$ (5) $\qquad A=2Z$ (by subtracting B from both sides of preceding equation)

(6) $\qquad 2Z+2P=180°$ (substituting Equation 5 in Equation 3)

$\qquad Q.E.D. Z.+P=90°$ (dividing previous equation, both sides, by 2)

The arms 14 provide a swinging fulcrum, upon which boom 12 may fulcrum while shifting longitudinally at a rate such as to maintain the vertical relationship between the path of movement 51 of pivot 25 and the base plane 16—16.

The linkage 35, 38, 39, 44, 49 may be appropriately referred to collectively as pantograph linkage.

I claim:

1. In a lifting mechanism, a swinging fulcrum; a boom pivoted midway between its ends upon said fulcrum; means providing a combined pivotal and sliding connection between the lower end of said boom and a supporting base; a movable base carried by the upper end of said boom; and means for shifting said lower end of the boom in its path of sliding movement, whereby to move said upper end of the boom in a vertical path, said last mentioned means comprising a hydraulic servomotor including piston rod and cylinder elements, one pivotally attached to said supporting base adjacent the pivotal attachment between the latter and said fulcrum, and the other pivotally attached to said boom between its fulcrum pivot and its said lower end, whereby retraction of said piston rod will draw said lower end toward said fulcrum and thereby elevate said upper end of the boom.

2. The lifting mechanism as defined in claim 1, wherein said one hydraulic servomotor element is pivoted upon the pivot connecting the lower end of said fulcrum to said supporting base.

3. In a lifting mechanism, a swinging fulcrum; a boom pivoted midway between its ends upon said fulcrum; means providing a combined pivotal and sliding connection between the lower end of said boom and a supporting base; a movable base carried by the upper end of said boom; and means for maintaining said movable base parallel to said supporting base, said last means comprising a bell crank pivotally attached to said boom at its axis of pivotal connection to said fulcrum, and links disposed respectively parallel to said boom and said fulcrum, one of said links being pivotally connected to said bell crank and said movable base respectively and the other link being pivotally connected to said bell crank and supporting base respectively, in respective parallelogram linkages.

4. In a lifting mechanism, a swinging fulcrum; a boom pivoted midway between its ends upon said fulcrum; means providing a combined pivotal and sliding connection between the lower end of said boom and a supporting base; a movable base carried by the upper end of said boom; and pantograph linkage linking said camera base to said supporting base through the pivot connecting said boom to said fulcrum, whereby to maintain said movable base parallel to said supporting base at all positions of elevation of said movable base.

5. In a lifting mechanism, a swinging fulcrum; a boom pivoted midway between its ends upon said fulcrum; means providing a combined pivotal and sliding connection between the lower end of said boom and a supporting base, said sliding connection comprising a track attached to said supporting base and embodying parallel tracks having opposed bearing rails, and slides having bearing ways receiving and slidably supported between said rails; a movable base carried by the upper end of said boom; and means for shifting said lower end of the boom in its path of sliding movement, whereby to move said upper end of the boom in a vertical path.

6. In a lifting mechanism, a swinging fulcrum; a boom pivoted midway between its ends upon said fulcrum; means providing a combined pivotal and sliding connection between the lower end of said boom and a supporting base, said sliding connection comprising a track attached to said supporting base and embodying parallel tracks having opposed bearing rails, slides having bearing ways receiving and slidably supported between said rails, pivot studs each having an outer end secured to a respective slide and having a threaded inner end, and a turnbuckle sleeve joining said threaded ends for adjusting the spacing of said slides; a movable base carried by the upper end of said boom; and means for shifting said lower end of the boom in its path of sliding movement, whereby to move said upper end of the boom in a vertical path.

References Cited in the file of this patent

UNITED STATES PATENTS

| | | |
|---|---|---|
| D. 166,112 | Krilanovich | Mar. 11, 1952 |
| 2,099,903 | Nilson | Nov. 23, 1937 |
| 2,145,033 | Tondreau | Jan. 24, 1939 |
| 2,404,577 | Jackson | July 23, 1946 |
| 2,476,380 | Manke | July 19, 1949 |
| 2,479,679 | Grime | Aug. 23, 1949 |
| 2,480,916 | Gibson | Sept. 6, 1949 |